US006717363B2

United States Patent
Foust et al.

(10) Patent No.: US 6,717,363 B2
(45) Date of Patent: Apr. 6, 2004

(54) CONTROL OF LEACHABLE MERCURY IN FLUORESCENT LAMPS BY GELATIN

(75) Inventors: Donald Franklin Foust, Scotia, NY (US); David Key Dietrich, Niskayuna, NY (US); Deborah Ann Haitko, Schenectady, NY (US)

(73) Assignee: General Electric Company, Niskayuna, NY (US)

(*) Notice: Subject to any disclaimer, the term of this patent is extended or adjusted under 35 U.S.C. 154(b) by 240 days.

(21) Appl. No.: 09/920,128

(22) Filed: Aug. 1, 2001

(65) Prior Publication Data

US 2002/0058454 A1 May 16, 2002

Related U.S. Application Data

(63) Continuation-in-part of application No. 09/208,873, filed on Dec. 10, 1998, now abandoned.

(51) Int. Cl.$^7$ .............................................. H01J 17/26
(52) U.S. Cl. .................. 313/565; 313/547; 313/318.08; 445/2; 445/41
(58) Field of Search ................................ 313/553, 547, 313/565, 318.03, 318.08; 445/2, 41, 55

(56) References Cited

U.S. PATENT DOCUMENTS

| | | | |
|---|---|---|---|
| 5,229,686 A | 7/1993 | Fowler et al. | 313/565 |
| 5,229,687 A | 7/1993 | Fowler et al. | 313/565 |
| 5,736,813 A * | 4/1998 | Foust et al. | 313/490 |
| 5,754,002 A * | 5/1998 | Haitko et al. | 313/565 |
| 5,777,434 A | 7/1998 | Dietrich et al. | 313/565 |
| 5,821,682 A | 10/1998 | Foust et al. | 313/318.08 |
| 5,846,109 A * | 12/1998 | Foust et al. | 445/2 |

* cited by examiner

Primary Examiner—Nimeshkumar D. Patel
Assistant Examiner—Kevin Quarterman
(74) Attorney, Agent, or Firm—Toan P. Vo; Patrick K. Patnode

(57) ABSTRACT

The formation of leachable mercury upon disposal in a landfill or during TCLP testing of mercury vapor discharge lamps is substantially prevented by incorporation of an amount of gelatin or a degradation product of gelatin which is effective to substantially prevent formation of ferric and cuprous compounds responsible for forming leachable mercury compounds.

7 Claims, 2 Drawing Sheets

CONTROL OF LEACHABLE MERCURY IN FLUORESCENT LAMPS BY GELATIN

CROSS-REFERENCE TO RELATED APPLICATION

This application is a continuation-in-part of application Ser. No. 09/208,873, filed Dec. 10, 1998, now abandoned.

BACKGROUND OF THE INVENTION

This invention is directed broadly to mercury vapor arc discharge lamps and more particularly to methods for avoidance of soluble mercury pollution of landfills and groundwater upon disposal of such lamps and during TCLP testing for leaching of soluble mercury materials from such lamps. Compositions of matter useful in preventing the formation of leachable mercury in disposal and testing procedures form a part of the invention.

Mercury arc vapor discharge lamps, otherwise commonly known as fluorescent lamps, are standard lighting means. The mercury arc vapor discharge lamp consists of metallic components such as lead wires, connector pins and end caps. The lead wires and portions of the end cap and connector pins are surrounded by a glass enclosure. The interior of the glass enclosure is typically coated with phosphor. Elemental mercury is added to the mercury arc vapor discharge lamp and typically, the elemental mercury adheres to the phosphor. In certain conditions, it has been found that when elemental mercury comes in contact with the metal components in a lamp such as copper and iron containing lead wires, brass pins, or other associated metallic mount components, the elemental mercury is transformed into a leachable form.

In order to address the growing concern that mercury from disposal of fluorescent lamps might leach into surface and subsurface water, the Environmental Protection Agency has established a maximum concentration level for mercury at 0.2 milligrams of leachable mercury per liter of extract fluid. The concentration level for mercury is generally determined by a standard analysis known as the Toxicity Characteristic Leaching Procedure (TCLP), a well known test procedure.

When carrying out the TCLP test, test lamps are pulverized to form lamp waste material similar to that which would result from lamp disposal in land fills or other disposal locations. The ambient conditions in disposal locations may be such as to promote formation of leachable mercury. The TCLP test conditions themselves tend to allow for formation of leachable mercury in amounts greater than the established limit of 0.2 milligrams per liter.

During the disposal of the lamp, and in the TCLP test, the glass enclosure of the lamp is broken. Elemental mercury that is contained in the lamp is then exposed to the metal components in an aqueous environment. Elemental mercury, when exposed to both the metal components and the aqueous environment, is oxidized to leachable mercury. The metal components in the lamp provide the source of oxidizable iron and oxidizable copper that promotes the formation of leachable mercury.

There is concern about the environmental impact of soluble mercury compounds which can leach into ground water sources, rivers, streams, and the like. In the prior art, certain oxidants and reductants are placed in a lamp to alter the form of mercury during the course of the TCLP test. These agents function to remove leachable mercury from the TCLP solution.

Generally, any modification of the lamp components is driven by the need to decrease the amount of leachable mercury. Methods and materials are constantly being sought which decrease the leachable mercury values upon performance of the TCLP extraction test.

SUMMARY OF THE INVENTION

The present invention provides a method for preventing formation of leachable mercury compounds during TCLP testing of mercury vapor discharge lamps having an envelope of light transmitting glass and an amount of elemental mercury which comprises incorporating into the lamp structure an amount of pure gelatin or a degradation product of pure gelatin in the form of a discrete button which is effective to substantially prevent formation of ferric and cuprous compounds when iron and copper components of the lamp are exposed to moisture and acidic conditions.

The present invention further provides a mercury vapor arc discharge lamp comprising pure gelatin or degradation product of pure gelatin incorporated in the lamp structure in the form of a discrete button wherein the gelatin is present in a range between about 0.02 grams and about 3 grams per lamp.

BRIEF DESCRIPTION OF THE DRAWING(S)

The present invention will become more readily apparent from the following exemplary description in connection with the accompanying drawings, wherein FIG. 1 represents the effects of gelatin in lamps on various levels of mercury compared with leachable mercury formed with no gelatin.

FIG. 2 represents the effects of the addition of gelatin to lamps dosed with 20 milligrams of elemental mercury.

DESCRIPTION OF THE INVENTION

The incorporation of an effective amount of pure gelatin or degradation product of pure gelatin in a mercury vapor arc discharge lamp prevents oxidation of iron and copper metal components to a form which is both soluble and capable of oxidizing elemental mercury to a soluble form of mercury oxide. Accordingly the formation and dissolution of soluble ferric and cuprous compounds from the lamp components is diminished or prevented resulting in reduction of leachable mercury compounds. In general, an effective amount of the pure gelatin or degradation product of pure gelatin will be enough for the TCLP test results to show the presence of less than about 0.2 parts per million of leachable mercury. Typically, the amount of pure gelatin or degradation product of pure gelatin incorporated in the lamp is in a range between about 0.02 grams and about 3 grams per lamp.

The gelatin of the present invention is pure. "Pure" as used herein refers to at least about 99.9% gelatin such that it is 99.9% free from other materials when it is dispersed in the lamp. Typically, the gelatin is used as received from a manufacturer. The gelatin is not dispersed in the lamp as an admixture but is typically in the form of a discrete button. The term "gelatin" refers to a heterogeneous mixture of water soluble proteins of high average molecular weight. Gelatin is not found in nature but derived from collagen by hydrolytic action. Gelatin is obtained by boiling skin, tendon, bones, ligaments in water. Gelatin is colorless or slightly yellowish, transparent, sheets, flakes or coarse powder which absorbs in a range between about 5 times and about 10 times its weight of water to form a gel in solutions. It is soluble in hot water, glycerol, and acetic acid. It is insoluble in organic solvents. Various gelatin equivalents such as alginates, gums, and cellulose derivatives are contemplated for use in the present invention. Additionally, degradation products of gelatin are contemplated for use in the present invention.

Specific examples of gelatin and gelatin-like materials include Peters Gelatin, Stamere CK gelatin, Arabic G150 Gelatin, Tragacanth L gelatin, Agar Agar 80, Ghatti, Sodium Alginate and in general, all cellulose and natural based gelatins.

"Leachable mercury" as used herein refers to elemental mercury ($Hg^0$) that has been oxidized. Oxidized mercury reacts with oxygen to form compounds such as mercuric oxide (HgO). Once the lamp has been broken and the elemental mercury can oxidize to leachable mercury, the leachable mercury can be carried via groundwater, rivers and streams.

The formation of leachable mercury when mercury vapor discharge lamps are broken and exposed to landfill conditions can be prevented or minimized by preventing oxidation of certain components of the lamp. Certain metal components of fluorescent lamps particularly iron lead wires, copper coated leads, and any brass components generate ferric ($Fe^{+3}$) and cuprous ($Cu^{+1}$) ions when exposed to moisture, oxygen, and acidity.

It has been found that elemental mercury added to mercury-free pulverized lamp materials prepared for the TCLP test is converted to leachable mercury in the course of the test. If elemental mercury alone or in combination with various glass, phosphor, or non-metal lamp components is tested, little or essentially no leachable mercury is found. When elemental mercury is tested in combination with metal lamp components such as copper or iron, lead wires, pins, or other metal hardware, the mercury is transformed into a leachable form. The ferric and cuprous ions form soluble compounds which oxidize elemental mercury to the monovalent, mercurous form which is soluble in an acidic aqueous environment and therefore leachable.

Gelatins incorporated into fluorescent lamps during manufacture become operative in the course of preparing lamps for the TCLP test or upon destruction of the lamp during disposal. The presence of such gelatins make the TCLP test more accurate and reliable and reduce the formation of soluble mercury compounds when the lamps are disposed of. Gelatin incorporated in the lamp prevents formation of ferric and cuprous compounds, in the presence of water or moisture, by oxidation of iron and copper from lamp components, thereby greatly reducing or substantially preventing the formation of leachable mercurous and mercuric compounds by oxidation of elemental mercury.

The mercury vapor discharge lamp of the present invention includes an envelope of light transmitting glass which contains an inert gas and an amount of elemental mercury, a pair of electrodes for establishing an arc discharge, and an effective amount of a gelatin antioxidant. The lamps generally include at least one base or end cap which defines a cavity having an inner surface. The cap is secured to the glass lamp envelope by a basing cement. Generally, fluorescent lamps of the tube type have a pair of end caps. The gelatin is typically incorporated in the lamp by placing a portion of the material on the interior of the end cap, such that it does not affect lamp function. Typically, the end cap is made of aluminum.

The principles and practice of this invention will be more fully understood when considered in view of the following examples.

TCLP test data was obtained by the test procedure prescribed on pages 26987–26998 volume 55, number 126 of the June 29, 1990 issue of the Federal Register.

Briefly, lamps being tested were pulverized into particulate form having the prescribed particle size which was capable of passing through a ⅜ inch sieve. The test material was then extracted with a sodium acetate-acetic acid buffer at a pH of about 4.93.

The formation of soluble mercury compounds is illustrated by the data in Table 1, below. Carrying out the TCLP test in the presence of air generated about 1 part per million of copper and about 0.3 parts per million of soluble iron. The amount of soluble mercury formed under these conditions exceeds the regulatory limit of 0.2 parts per million. Increasing the exposure to oxygen increased the amount of soluble copper and soluble mercury formed. Decreasing exposure to oxygen decreased the formation of soluble copper, soluble iron, and soluble mercury.

TABLE 1

| Gas Type | Soluble Cu (ppm) | Soluble Hg (ppm) |
| --- | --- | --- |
| Air | 1.07 | 0.777 |
| Argon | 0.06 | <0.050 |
| Oxygen | 3.04 | 1.030 |

When the amount of oxygen is varied by increasing the volume of the head space in the TCLP test jar, the effect of both soluble iron and copper on the formation of soluble mercury is evident from the data in Table 2, below. As the head space volume increases, the amount of soluble mercury increases in response to the formation of increasing amounts of soluble copper and iron.

TABLE 2

| Sample | Head Space (mL) | Soluble Hg (ppb) | Soluble Fe (ppm) | Soluble Cu (ppm) |
| --- | --- | --- | --- | --- |
| 0 | 0.0 | 210 | 3.62 | 0.35 |
| 1 | 140 | 214 | 4.63 | 0.40 |
| 2 | 205 | 203 | 5.04 | 0.63 |
| 3 | 360 | 250 | 5.22 | 0.43 |
| 4 | 494 | 311 | 5.22 | 0.51 |
| 5 | 763 | 525 | 6.13 | 1.04 |
| 6 | 1013 | 458 | 5.80 | 1.02 |
| 7 | 1508 | 583 | 8.12 | 1.13 |

Since finding that elemental mercury added to undosed lamps generates leachable mercury in the TCLP test, we have been developing an understanding of why mercury leaches under these conditions. If one tests elemental mercury alone or in combination with the glass or phosphor (from an undosed fluorescent lamp) under TCLP conditions, no mercury leaches. It is only when elemental mercury comes in contact with the metal components in the lamp such as the copper and iron containing lead wires, brass pins, or other associated metallic hardware that mercury is transformed into a leachable form. It was determined by control experiments that both Fe+3 and Cu+1 are capable of generating oxidized forms of mercury that are leachable under TCLP conditions. It is known that corrosion or dissolution of metals from the metallic state requires both oxygen and water, both present under TCLP conditions. When gelatin is used under TCLP conditions, dissolution or oxidation of metals like iron and copper is decreased.

Figure 1:
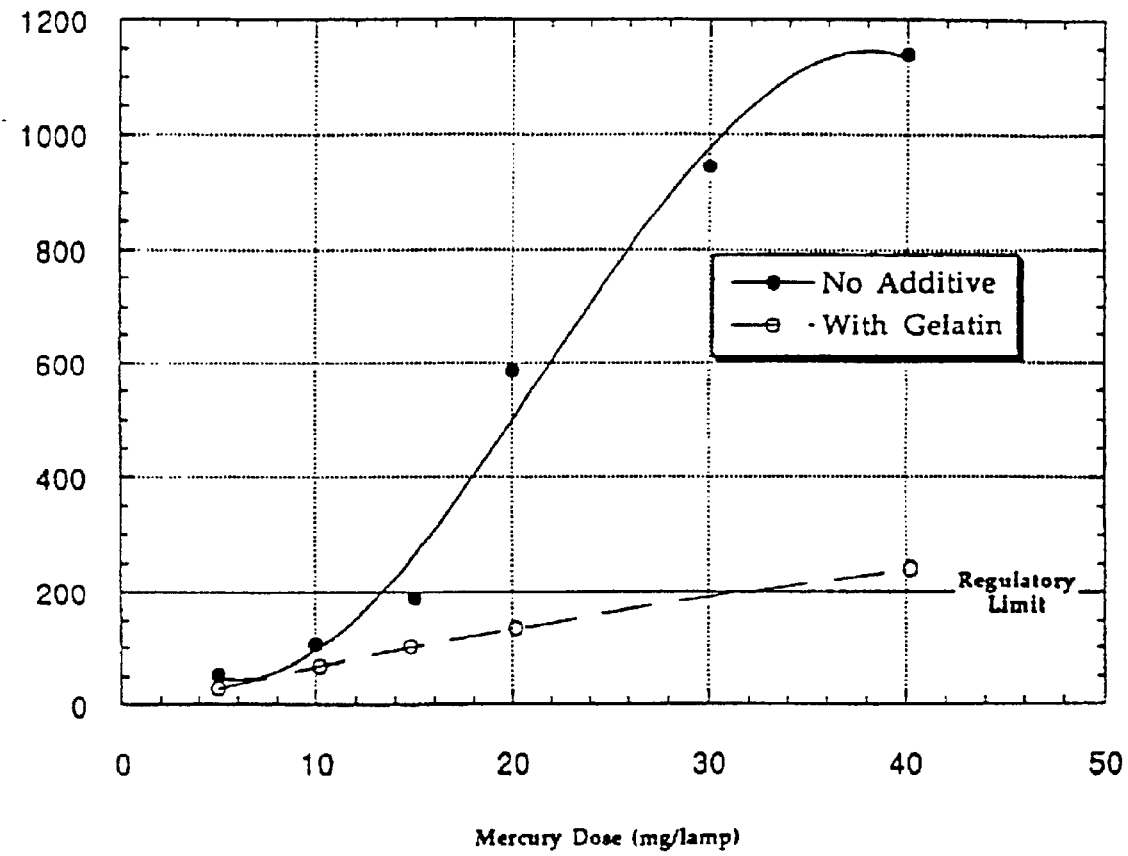
FIG. 1 shows the effect of 0.5 grams of gelatin per lamp on leachable mercury at various mercury levels compared with leachable mercury formed with no gelatin. One half gram of gelatin maintained the amount of leachable mercury below the regulatory limit up to about 20 milligrams of elemental mercury per lamp.
Figure 2:
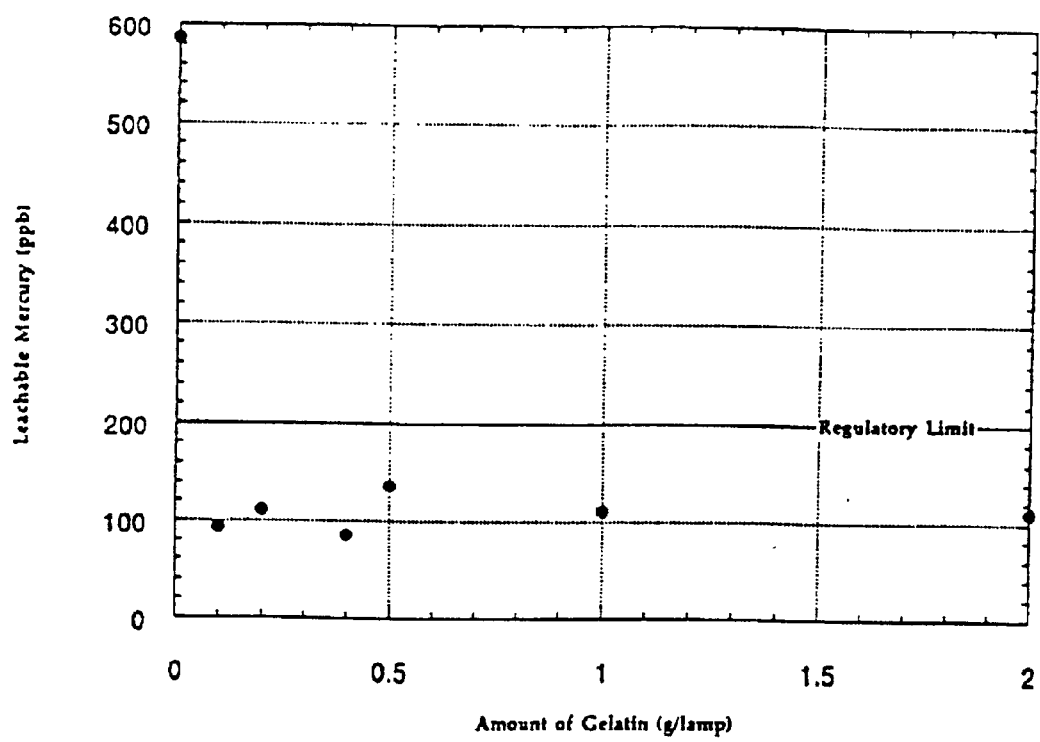
FIG. 2 shows the effect of various levels of gelatin addition for lamps dosed with 20 milligrams of elemental mercury. As little as 0.1 gram of gelatin per lamp maintained the amount of leachable mercury below the regulatory limit.

A comparison of the results of gelatin after testing under TCLP conditions when it was dispersed in the lamp in pure form and dispersed in the basing cement can be seen in Tables 3 and 4. Table 3 demonstrates that different types of gelatin achieved levels of leachable mercury below the regulatory limit. In the tests from Table 3, each lamp was dosed with 20 milligrams of mercury. Table 4 shows that gelatin admixed with basing cement was not effective in reducing the amount of leachable mercury below the regulatory limit. The basing cement contained 78.85 weight % marble flour (limestone-CaO), 16.74 weight % of a combination of a shellac, rosin and denatured alcohol, and 3.96 weight % of durite (phenolformaldehyde resins). Denatured alcohol was used to control the viscosity of the basing cement and an additional 0.45 weight % was added to the formulation. The cement was dispensed through a feeder into the base and heated to cure once assembled with the lamp. The curing drove off the solvent and solidified the cement.

TABLE 3

| Gelatin type | Amount of gelatin (g/base) | Leachable Hg (ppb) |
|---|---|---|
| Gelatin | 0.2 | 86 |
| 170D Stamere Gelatin | 0.1 | 101 |
| Animal Glue | 1.00 | 106 |
| Dehydrated animal glue | 1.00 | 40 |

TABLE 4

| Amount of gelatin | Leachable Hg (ppb) | Total Hg (mg) |
|---|---|---|
| 0.3 | 979 | 35.6 |
| 0.3 | 2353 | 29.0 |

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A method for preventing formation of leachable mercury compounds during TCLP testing of mercury vapor discharge lamps having an envelope of light transmitting glass and an amount of elemental mercury which comprises incorporating into the lamp structure an amount of an antioxidant consist of pure gelatin or a degradation product of pure gelatin in the form of a discrete button which is effective to substantially prevent formation of ferric and cuprous compounds when iron and copper components of the lamp are exposed to moisture and acidic conditions.

2. The method of claim 1 wherein the gelatin is incorporated in the lamp in an amount of about 0.02 to about 3 grams per lamp.

3. The method according to claim 1 wherein the gelatin is incorporated into the lamp structure on an end cap.

4. A method for preventing formation of leachable mercury compounds during TCLP testing of mercury vapor discharge lamps having an envelope of light transmitting glass and an amount of elemental mercury wherein the method comprises incorporating into an end cap of the lamp structure an amount of an antioxidant consisting of pure gelatin or a degradation product of pure gelatin in the form of a discrete button in a range between about 0.02 grams and about 3 grams per lamp which is effective to substantially prevent formation of ferric and cuprous compounds when iron and copper components of the lamp are exposed to moisture and acidic conditions.

5. A mercury vapor arc discharge lamp comprising an antioxidant consisting of pure gelatin or a degradation product of pure gelatin incorporated in the lamp structure in the form of a discrete button wherein the gelatin is present in a range between about 0.02 grams and about 3 grams per lamp.

6. The mercury vapor arc discharge lamp of claim 5 wherein the gelatin is incorporated into an end cap of the lamp structure.

7. A mercury vapor arc discharge lamp comprising an antioxidant consisting of pure gelatin in the form of a discrete button in a range between about 0.02 and about 3 grams per lamp wherein the gelatin is incorporated in an end cap of the lamp structure.

* * * * *